United States Patent
Sakai et al.

(10) Patent No.: US 11,634,035 B2
(45) Date of Patent: Apr. 25, 2023

(54) POWER SOURCE SYSTEM AND POWER SOURCE SYSTEM CONTROL METHOD

(71) Applicant: HONDA MOTOR CO., LTD., Tokyo (JP)

(72) Inventors: Ryoji Sakai, Wako (JP); Akihiro Matsui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 416 days.

(21) Appl. No.: 16/804,752

(22) Filed: Feb. 28, 2020

(65) Prior Publication Data
US 2020/0276903 A1 Sep. 3, 2020

(30) Foreign Application Priority Data
Mar. 1, 2019 (JP) .............................. JP2019-037782

(51) Int. Cl.
*B60L 15/20* (2006.01)
*B60L 50/60* (2019.01)
*H02P 6/08* (2016.01)

(52) U.S. Cl.
CPC .............. *B60L 15/20* (2013.01); *B60L 50/66* (2019.02); *H02P 6/08* (2013.01); *B60L 2240/545* (2013.01); *B60L 2240/642* (2013.01)

(58) Field of Classification Search
CPC .... B60L 15/20; B60L 50/66; B60L 2240/545; B60L 2240/642; B60L 50/70; B60L 58/32; B60L 2240/423; H02P 6/08; Y02T 10/64; Y02T 10/70; Y02T 10/72; Y02T 90/40
See application file for complete search history.

(56) References Cited

U.S. PATENT DOCUMENTS

| | | |
|---|---|---|
| 2006/0278450 A1 | 12/2006 | Shirasaka et al. |
| 2012/0232737 A1 | 9/2012 | Jeon |
| 2013/0297127 A1 | 11/2013 | Takamura et al. |
| 2014/0297086 A1 | 10/2014 | Matsuda et al. |
| 2015/0380755 A1 | 12/2015 | Kazuno |
| 2017/0145658 A1 | 5/2017 | Imura et al. |
| 2018/0126974 A1* | 5/2018 | Seo ................... B60W 30/1843 |
| 2019/0084426 A1 | 3/2019 | Tanaka et al. |

FOREIGN PATENT DOCUMENTS

| | | |
|---|---|---|
| CN | 102639356 A | 8/2012 |
| CN | 103269929 A | 8/2013 |
| CN | 103781655 A | 5/2014 |
| CN | 105980227 A | 9/2016 |

(Continued)

OTHER PUBLICATIONS

Office Action and search report dated Feb. 21, 2023 in the corresponding Chinese Patent Application No. 202010136259.4 and the machine English translation of detailed action.

*Primary Examiner* — Bickey Dhakal
(74) *Attorney, Agent, or Firm* — Carrier Shende & Associates, P.C.; Joseph P. Carrier; Jeffrey T. Gedeon (57) ABSTRACT

A first power source system includes a first motor control section that controls at least torque of a drive motor. When a temperature of an FC is less than or equal to a prescribed temperature Th and a demand for high output is made to the drive motor, the first motor control section limits the torque of the drive motor to be lower than a maximum torque that can be output by the drive motor, and continuously implements this torque limitation.

3 Claims, 8 Drawing Sheets

(56) References Cited

FOREIGN PATENT DOCUMENTS

| | | | |
|---|---|---|---|
| CN | 109247055 A | | 1/2019 |
| JP | 2003197228 A | * | 7/2003 |
| JP | 2006-345651 A | | 12/2006 |
| JP | 2007181271 A | * | 7/2007 |
| JP | 2009-154809 A | | 7/2009 |
| JP | 2016-012480 A | | 1/2016 |
| JP | 2018-058526 A | | 4/2018 |

* cited by examiner

POWER SOURCE SYSTEM AND POWER SOURCE SYSTEM CONTROL METHOD

CROSS-REFERENCE TO RELATED APPLICATION

This application is based upon and claims the benefit of priority from Japanese Patent Application No. 2019-037782 filed on Mar. 1, 2019, the contents of which are incorporated herein by reference.

BACKGROUND OF THE INVENTION

Field of the Invention

The present invention relates to a power source system and a power source system control method.

Description of the Related Art

Japanese Laid-Open Patent Publication No. 2006-345651 has an objective to prevent an excessive decrease in the system voltage of a fuel cell system, while preventing excessive limitation of the output of a motor causing a vehicle to travel. In order to achieve this objective, the fuel cell system described in Japanese Laid-Open Patent Publication No. 2006-345651 estimates the amount of the decrease in the system voltage corresponding to a driving state of the motor based on the temperature of the fuel cell and the revolution speed of the motor, sets a motor output limitation start voltage and a motor output limitation end voltage that are threshold values of the system voltage for respectively starting and stopping the execution of the process for limiting the output of the motor, and outputs these voltages to the motor ECU. The motor ECU sets an output limitation coefficient, which is a limitation rate when limiting the output of the motor, based on a detected value of the system voltage and each of the above voltages, to limit the output of the motor.

SUMMARY OF THE INVENTION

However, in a state where the temperature of the fuel cell is lower than a prescribed temperature, e.g. when there is a demand for high output such as a WOT (Wide Open Throttle), the motor output is suddenly limited and the output waveform becomes steep (see interval al in FIG. 4 of Japanese Laid-Open Patent Publication No. 2006-345651).

In such a case, the acceleration state ends suddenly, and despite the demand for high output, the acceleration does not continue. That is, a phenomenon that the feeling of acceleration does not continue occurs.

The present invention takes the above problem into consideration, and it is an objective of the present invention to provide a power source system and a power source system control method that can cause the feeling of acceleration to continue even when there is a demand for high output such as a WOT in a state where the temperature of the fuel cell is lower than a prescribed temperature, for example.

Furthermore, it is an objective of the present invention to provide a power source system and a power source system control method that can limit the acceleration when going downhill, even when there is a demand for high output such as a WOT while travelling downhill, for example.

A first aspect of the present invention comprises a power source mounted in a vehicle; a drive motor; a thermometer configured to measure a temperature of the power source; and a motor control section configured to control at least torque of the drive motor, wherein, when the temperature of the power source is less than or equal to a prescribed temperature and a demand for high output is made to the drive motor, the motor control section limits the torque of the drive motor to be lower than a maximum torque output by the drive motor and continuously implements the torque limitation.

A second aspect of the present invention comprises a power source mounted in a vehicle; a drive motor; a unit configured to sense a sloped road; and a motor control section configured to control at least torque of the drive motor, wherein, when the vehicle is travelling on a downhill road and a high output demand is made to the drive motor, the motor control section limits the torque of the drive motor to be lower than a maximum torque output by the drive motor and continuously implements the torque limitation.

A third aspect of the present invention comprises a power source mounted in a vehicle; a drive motor; a thermometer configured to measure a temperature of the power source; a unit configured to sense a sloped road; and a motor control section configured to control at least torque of the drive motor, wherein, when the temperature of the power source is less than or equal to a prescribed temperature, the vehicle is travelling on a downhill road, and a demand for high output is made to the drive motor, the motor control section limits the torque of the drive motor to be lower than a maximum torque output by the drive motor and continuously implements the torque limitation.

A fourth aspect of the present invention is a control method of a power source system that includes a power source mounted in a vehicle; a drive motor; a thermometer configured to measure a temperature of the power source; and a motor control section configured to control at least torque of the drive motor, wherein, when the temperature of the power source is less than or equal to a prescribed temperature and a demand for high output is made to the drive motor, the motor control section limits the torque of the drive motor to be lower than a maximum torque output by the drive motor and continuously implements the torque limitation.

A fifth aspect of the present invention is a control method of a power source system that includes a power source mounted in a vehicle; a drive motor; a unit configured to sense a sloped road; and a motor control section configured to control at least torque of the drive motor, wherein, when the vehicle is travelling on a downhill road and a high output demand is made to the drive motor, the motor control section limits the torque of the drive motor to be lower than a maximum torque output by the drive motor and continuously implements the torque limitation.

A sixth aspect of the present invention is a control method of a power source system that includes a power source mounted in a vehicle; a drive motor; a thermometer configured to measure a temperature of the power source; a unit configured to sense a sloped road; and a motor control section configured to control at least torque of the drive motor, wherein, when the temperature of the power source is less than or equal to a prescribed temperature, the vehicle is travelling on a downhill road, and a demand for high output is made to the drive motor, the motor control section limits the torque of the drive motor to be lower than a maximum torque output by the drive motor and continuously implements the torque limitation.

The above and other features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The following describes in detail preferred embodiments of the present invention, while referencing the accompanying drawings.

First, a system in which a first power source system 10A according to a first embodiment is adopted for a fuel cell is described, while referencing FIGS. 1 to 4B.

The basic apparatus configuration of a fuel cell vehicle 12 (referred to below simply as a vehicle 12) in which the first power source system 10A is adopted can be a widely known configuration. For example, the configuration described in Japanese Laid-Open Patent Publication No. 2016-012480 can be used. In the present specification, the description focuses on a configuration related to the features of the present invention, and descriptions (and drawings) of widely known configurations are omitted or summarized. In the present embodiment, the vehicle 12 in which an FC system is mounted is envisioned.

Figure 1:
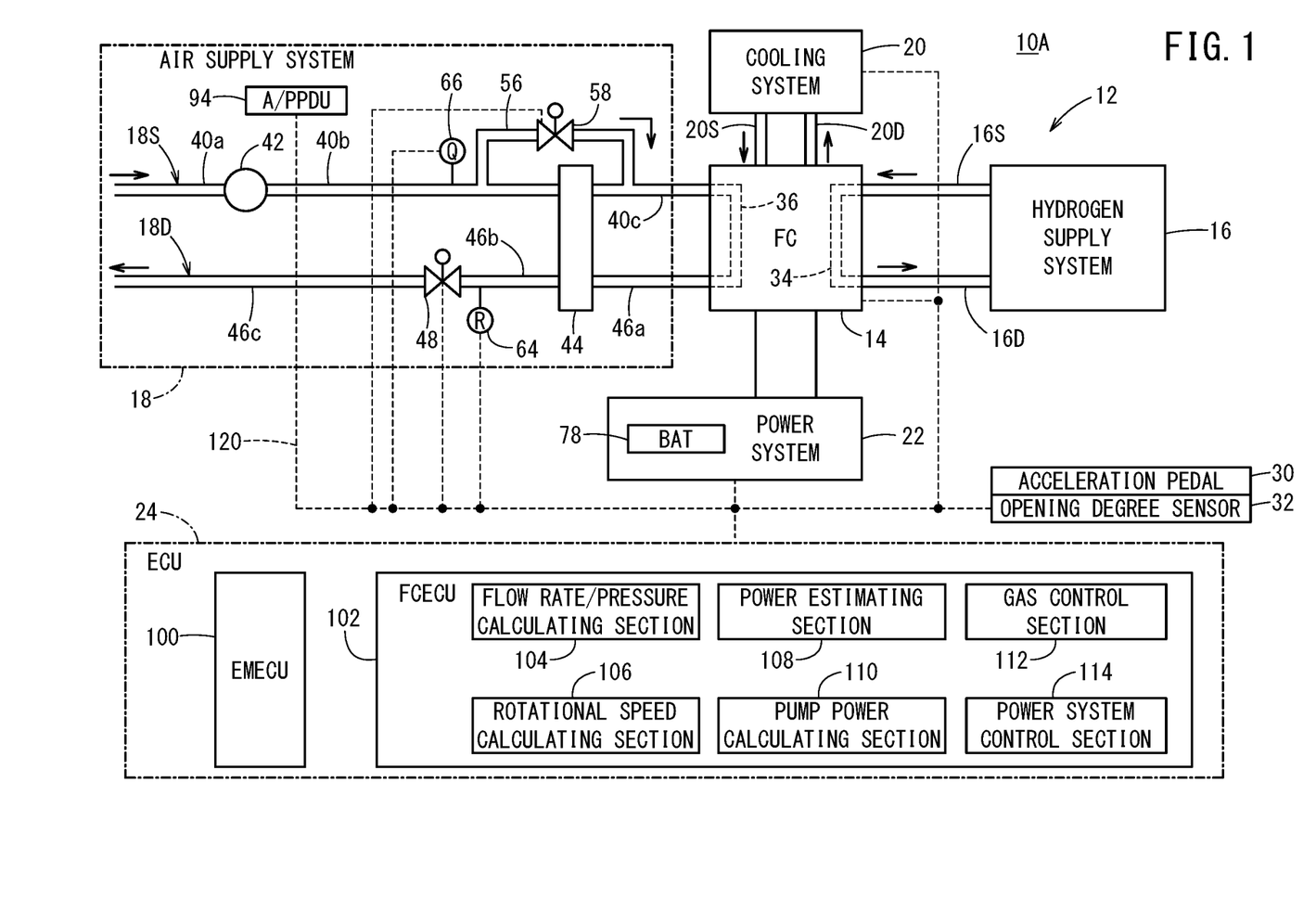
FIG. 1 is a schematic view of an overall configuration of a vehicle in which a representative first power source is mounted.

A power source system 10 includes a power source 14 mounted in the vehicle 12, a hydrogen supply system 16, an air supply system 18, a cooling system 20, a power system 22, and an ECU 24. Furthermore, as shown in FIG. 1, includes an opening degree sensor 32 that detects an opening degree (manipulation amount) of an acceleration pedal 30. A fuel cell (FC), for example, is used as the power source 14. The power source 14 using a fuel cell is referred to below as an FC 14.

The FC 14 has a structure in which fuel cells, formed by sandwiching a solid polymer electrolyte membrane between an anode electrode and a cathode electrode, are stacked. Hydrogen gas serving as the fuel gas is provided via an anode flow path 34 on the anode electrode side, and air serving as an oxidant is supplied via a cathode flow path 36 on the cathode electrode side. Water is generated and power is also generated due to a reaction between the hydrogen gas and oxygen in the air.

The hydrogen supply system 16 supplies the hydrogen gas to the FC 14 via a hydrogen supply flow path 16S, and also discharges anode off-gas generated by the FC 14 via a gas discharge flow path 16D. The hydrogen supply flow path 16S and the gas discharge flow path 16D are in communication with the anode flow path 34.

The air supply system 18 supplies the air to the FC 14 via an air supply flow path 18S, and also discharges a cathode off-gas generated by the FC 14 via a gas discharge flow path 18D. A pipe 40a, an air pump 42, a pipe 40b, a humidifier 44, and a pipe 40c are provided in the stated order from the upstream side (intake side), as the air supply flow path 18S. The pipe 40c on the downstream side is in communication with the cathode flow path 36 of the FC 14. A pipe 46a, the humidifier 44, a pipe 46b, a back pressure valve 48, and a pipe 46c are provided in the stated order from the upstream side (FC 14 side), as the gas discharge flow path 18D. The pipe 46a on the upstream side is in communication with the cathode flow path 36 of the FC 14. The pipe 40b and the pipe 40c of the air supply flow path 18S are connected by a pipe 56 that bypasses the humidifier 44. The pipe 56 is provided with a valve 58. The pipe 46b is provided with a pressure sensor 64. The pipe 40b is provided with a flow rate sensor 66.

The air pump 42 pumps external air sucked in via the pipe 40a to the cathode flow path 36 of the FC 14, via the pipe 40b, the humidifier 44, the pipe 40c, and the like. The humidifier 44 humidifies the air supplied from the air pump 42 using the cathode off-gas discharged from the FC 14. The back pressure valve 48 adjusts the pressure of the cathode flow path 36 of the FC 14, by adjusting the opening degree of a valve according to a control signal output from the ECU 24. The air pump 42, the back pressure valve 48, and the valve 58 are each controlled by the ECU 24. The output value detected by the pressure sensor 64 is output to the ECU 24, and the opening degree of the back pressure valve 48 is controlled such that this output value becomes a prescribed value. The actual flow rate value detected by the flow rate sensor 66 is output to the ECU 24.

The cooling system 20 supplies the coolant to the FC 14 via a coolant supply flow path 20S, and also recovers the coolant from the FC 14 via a coolant discharge flow path 20D. The coolant is cycled between the cooling system 20 and the FC 14, absorbs heat from the FC 14, and releases this heat with the cooling system 20.

Figure 2:
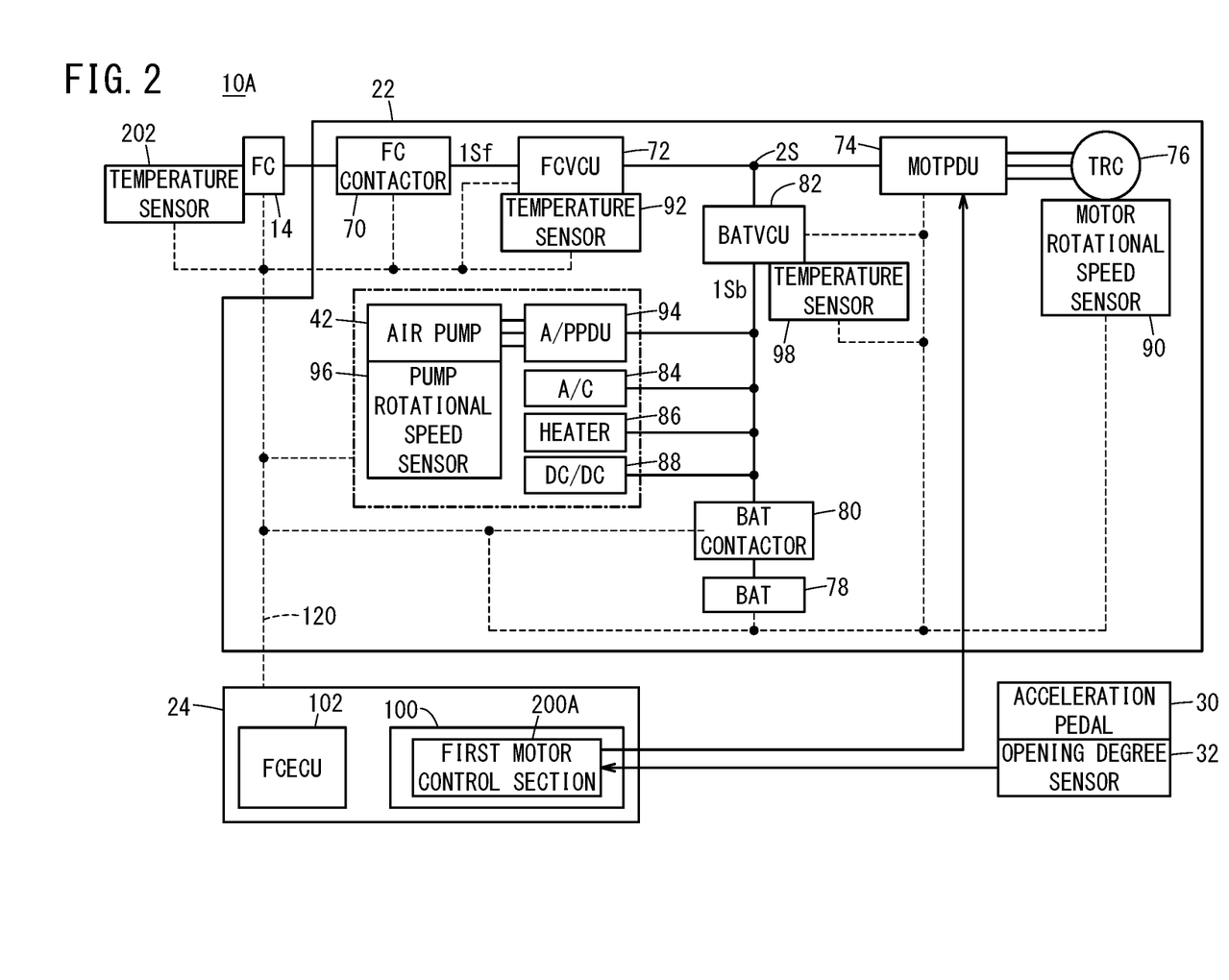
FIG. 2 is a schematic view of an overall configuration of a power system included in the first power source system.

The following describes the power system 22 using FIG. 2. The FC 14 is connected to a drive motor 76 (a traction motor (TRC), for example) via an FC contactor 70, a boost converter 72 (FCVCU), and an inverter 74 (MOTPDU). Furthermore, a high-voltage battery 78 (BAT) is connected to the drive motor 76 via a BAT contactor 80 and a buck-boost converter 82 (BATVCU). The boost converter 72 and the buck-boost converter 82 are connected in parallel to the drive motor 76, on a secondary side 2S thereof. Various high-voltage accessories, such as the air pump 42, an air conditioner 84 (A/C 84), a heater 86, and a buck converter 88 (also referred to as a DC/DC 88), for example, are connected in parallel to a primary side 1Sb of the buck-boost converter 82. The air conditioner 84 and the heater 86 function as a defroster apparatus.

The FC contactor 70 switches between providing a connection and a disconnection between the FC 14 and a primary side 1Sf of the boost converter 72, according to an open/close signal output from the ECU 24. The boost converter 72 is a voltage adjusting apparatus that includes a chopper circuit, and increases the voltage of the primary side 1Sf and applies this voltage to the secondary side 2S according to a control signal from the ECU 24. The inverter 74 is formed as a three-phase bridge, converts the DC voltage on the secondary side 2S into an AC voltage, and controls the drive motor 76 according to a control signal for a target rotational speed output from the ECU 24. The inverter 74 functions as a converter during regeneration, and converts the AC voltage generated by the drive motor 76 into a DC voltage. The inverter 74 and the drive motor 76 are so-called loads. The drive motor 76 is driven by the power of the high-voltage battery 78 and/or the FC 14, and functions as a power generator during regeneration. The drive motor 76 is provided with a motor rotational speed sensor 90. The motor rotational speed sensor 90 detects the rotational speed of the drive motor 76, and outputs a rotational speed signal to the ECU 24.

The high-voltage battery 78 discharges power equal to the amount of power by which the power generation of the FC 14 is insufficient for the actual power consumption during power running, and is charged with the excess amount of the power generated by the FC 14 and the loads that exceeds the actual power consumption during regeneration. The SOC of the high-voltage battery 78 is monitored by the ECU 24. The BAT contactor 80 switches between providing a connection and a disconnection between the high-voltage battery 78 and the primary side 1Sb of the buck-boost converter 82, according to an open/close signal output from the ECU 24. The buck-boost converter 82 is a voltage adjusting apparatus that includes a chopper circuit, increases the voltage on the primary side 1Sb and applies the resulting voltage to the secondary side S2 during power running, and reduces the voltage on the secondary side 2S and applies the resulting voltage to the primary side 1Sb during regeneration, according to a control signal output from the ECU 24.

The air pump 42 that is also included in the air supply system 18 (see FIG. 1) is connected to the primary side 1Sb of the buck-boost converter 82, via an air pump PDU 94 (A/PPDU). The air pump PDU 94 includes a three-phase bridge inverter, converts the DC voltage on the primary side 1Sb into an AC voltage, and controls the air pump 42 according to a control signal for the target rotational speed output from the ECU 24. A pump rotational speed sensor 96 detects the rotational speed of the air pump 42 and outputs a rotational speed signal to the ECU 24.

The boost converter 72 is provided with a first temperature sensor 92. The first temperature sensor 92 detects the temperature of the boost converter 72 and outputs a temperature signal to the ECU 24. Similarly, the buck-boost converter 82 is provided with a second temperature sensor 98. The second temperature sensor 98 detects the temperature of the buck-boost converter 82, and outputs a temperature signal to the ECU 24. The first temperature sensor 92 and the second temperature sensor 98 function as abnormality sensing apparatuses that sense temperature abnormalities of the boost converter 72 and the buck-boost converter 82, respectively.

The following describes the ECU 24 using FIGS. 1 and 2. The ECU 24 includes an energy management ECU 100 (also referred to as an EMECU 100) and an FCECU 102. The EMECU 100 and the FCECU 102 are each a calculator including a microcomputer, and include a CPU, a ROM (including an EEPROM), a RAM, an input/output apparatus such as an A/D convertor or D/A convertor, a timer serving as a timing section, and the like. The ECUs 100 and 102 each function as various function realizing sections (function realizing units) such as a control section, a calculating section, and a processing section, for example, by having the CPU read and execute programs stored in the ROM. The ECUs 100 and 102 may each be formed by only one ECU, or may each be formed by a plurality of ECUs.

The EMECU 100 is configured to perform energy management (EM) of the FC system. Furthermore, the EMECU 100 is configured to output a target power value of the FC 14 to the FCECU 102 as a current command value.

The FCECU 102 functions as a flow rate/pressure calculating section 104, a rotational speed calculating section 106, a power estimating section 108, a pump power calculating section 110, a gas control section 112, and a power system control section 114, by having the CPU read and execute the programs stored in the ROM.

The flow rate/pressure calculating section 104 is configured to calculate the target flow rate/pressure of the air pump 42. The rotational speed calculating section 106 is configured to calculate the target rotational speed of the air pump 42 needed to obtain the target flow rate. The power estimating section 108 is configured to calculate a power estimation value. The power estimation value is the power needed for the air pump 42 to realize the flow rate and pressure ratio of the air pump 42 (the ratio between the intake side pressure and discharge side pressure of the air pump 42) at this timing.

The pump power calculating section 110 is configured to calculate a power consumption upper limit value Pul of the air pump 42. Furthermore, the pump power calculating section 110 is configured to limit the power consumption upper limit value Pul of the air pump 42 in a case where an abnormality has occurred in the boost converter 72 or the buck-boost converter 82, e.g. in a case where an abnormal temperature that is greater than or equal to a prescribed temperature has been detected by the first temperature sensor 92 or the second temperature sensor 98. The power consumption upper limit value Pul is an upper limit for the power allowed when driving the air pump 42, and is set to the rated value of the air pump 42 when there are no abnormalities in the boost converter 72 and the buck-boost converter 82.

The gas control section 112 is configured to control the gases of the hydrogen supply system 16 and the air supply system 18. Here, the gas control section 112 is configured to perform feedback control of the back pressure valve 48 in accordance with the target pressure and the detection value of the pressure sensor 64.

The power system control section 114 is configured to control the power system 22 (the FC contactor 70, the boost converter 72, the inverter 74, the BAT contactor 80, the buck-boost converter 82, the air pump 42, and the high-voltage accessories 84, 86, and 88), based on the energy management performed by the EMECU 100. Furthermore, the power system control section 114 is configured to limit the power passing through the boost converter 72 in a case where an abnormality has occurred in the boost converter 72, e.g. a case in which an abnormal temperature has been detected by the first temperature sensor 92. Yet further, the power system control section 114 is configured to limit the power passing through the buck-boost converter 82 in a case where an abnormality has occurred in the buck-boost converter 82, e.g. a case in which an abnormal temperature has been detected by the second temperature sensor 98.

The ECUs 100 and 102 are each connected in a communicable manner to each of the hydrogen supply system 16, the air supply system 18, the cooling system 20, and the power system 22 via a signal line 120. The CPU executes the programs stored in the ROM to detect the sensor detection values of the opening degree sensor 32, the pressure sensor 64, the flow rate sensor 66, the first temperature sensor 92, the second temperature sensor 98, the pump rotational speed sensor 96, and the like; the voltage and current of the FC 14;

the voltage, current, and rotational speed of the air pump 42; the voltage, current, and rotational speed of the TRC 76; the voltage, current, temperature, and SOC of the BAT 78; the voltage and current of the secondary side 2S; and the like, for example, and to control each device.

As shown in FIG. 2, the EMECU 100 functions as a first motor control section 200A by having the CPU read and execute the programs stored in the ROM.

Furthermore, the FC 14 is provided with a third temperature sensor 202. The third temperature sensor 202 detects the temperature of the FC 14 (the FC stack temperature or the FC atmospheric temperature Ta) and outputs a temperature signal to the EMECU 100. The opening degree (manipulation amount) from the opening degree sensor 32 that detects the opening degree (manipulation amount) of the acceleration pedal 30 is also supplied to the EMECU 100. Furthermore, Ta indicates either one of the FC stack temperature or the FC atmospheric temperature Ta.

The first motor control section 200A of the EMECU 100 outputs a control signal to the inverter 74 (MOTPDU) based on at least the input of the opening degree from the opening degree sensor 32 and the temperature information from the third temperature sensor 202 described above, and controls the torque of the drive motor 76.

Specifically, when the temperature of the FC 14 is low and a demand for high output including a WOT is made to the drive motor 76, the first motor control section 200A limits the torque of the drive motor 76 to be a torque that is lower than a maximum torque that can be output by the drive motor 76, and continuously implements this torque limitation. For example, a switch is made from a map of characteristics that causes a large torque for low speeds to a map of characteristics that cause a medium torque for low to medium speeds, serving as a characteristic map (N-T map of the drive motor 76 indicating the relationship between the torque and the rotational speed used to drive the drive motor 76, for example.

The first motor control section 200A determines that a demand for high output is made to the drive motor 76 when a signal from the opening degree sensor 32 indicates 90% or more for the throttle opening degree, for example.

Figure 3:
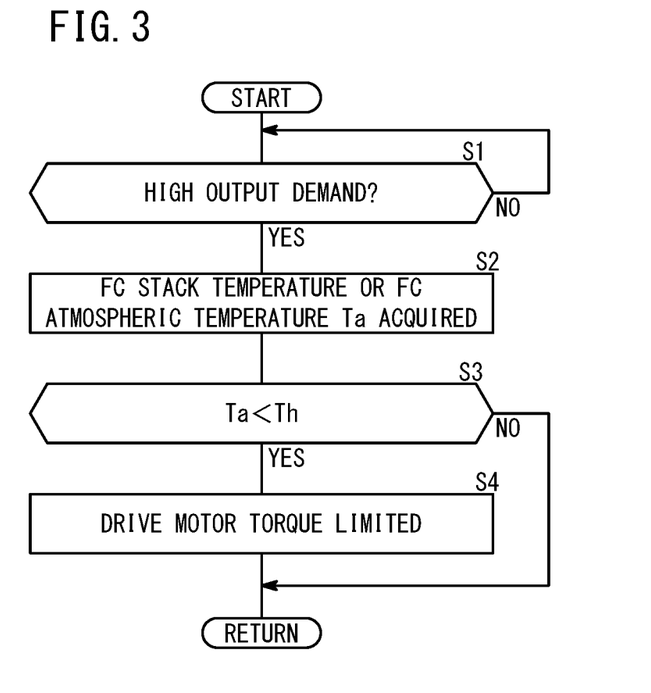
FIG. 3 is a flow chart showing a processing operation of a first motor control section.

The following describes a processing operation of the first power source system 10A, that is, a processing operation of the first motor control section 200A, while referencing the flow chart of FIG. 3.

First, at step S1 of FIG. 3, the first motor control section 200A determines whether a demand for high output including a WOT has been made to the drive motor 76.

If a demand for high output has been made, the process moves to step S2, and the first motor control section 200A acquires the temperature of the FC 14 (FC stack temperature or FC atmospheric temperature Ta) from the third temperature sensor 202.

At step S3, the first motor control section 200A determines whether the FC stack temperature or the FC atmospheric temperature Ta is lower than a prescribed temperature Th (i.e. whether this temperature is a low temperature). If this temperature is a low temperature, the first motor control section 200A limits the torque of the drive motor 76 at step S4. Specifically, the first motor control section 200A limits the torque to be lower than the maximum torque that can be output by the drive motor 76.

At step S3 described above, if the FC stack temperature or the FC atmospheric temperature Ta is greater than or equal to the prescribed temperature Th, the torque limiting is not performed. After this, when a prescribed time has passed, the processes from step S1 are repeated.

Figure 4A:
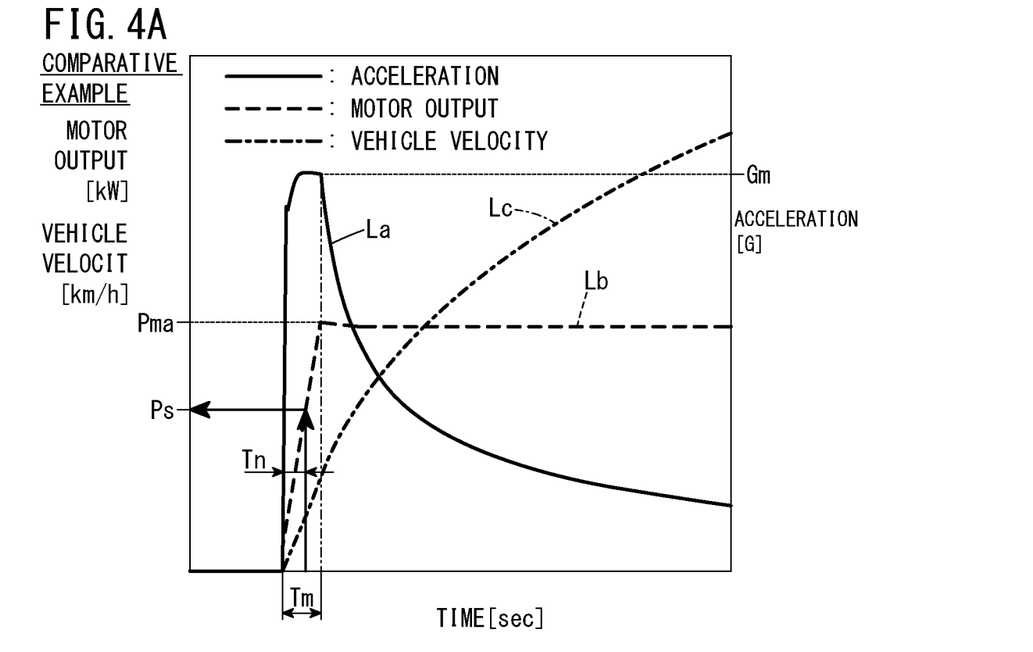
FIG. 4A is a graph showing changes in acceleration, motor output, and vehicle velocity of a comparative example.
Figure 4B:
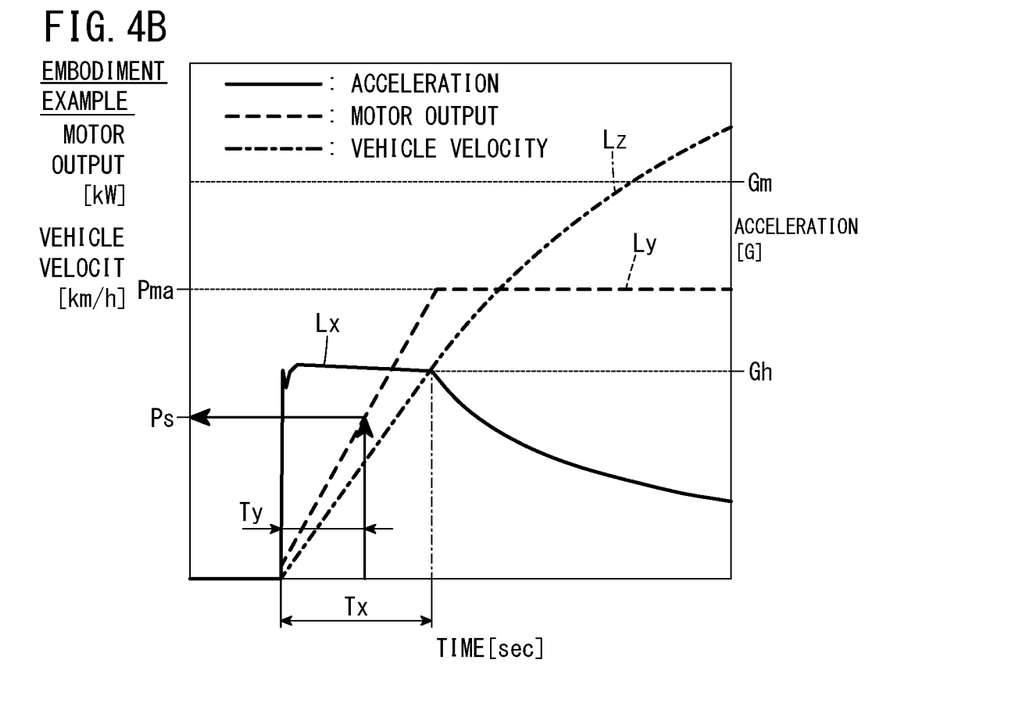
FIG. 4B is a graph showing changes in acceleration, motor output, and vehicle velocity of an embodiment example.

The following describes differences between a comparative example and an embodiment example, while referencing FIGS. 4A and 4B.

First, the comparative example in which the torque limiting is not performed when a demand for high output is made to the drive motor 76 is described.

In the comparative example, as shown by a solid line La in FIG. 4A, the acceleration G rises steeply to a maximum level Gm (e.g. 0.4) and, after a short time Tm (e.g. 2 seconds or less), drops rapidly. As shown by a dashed line Lb in FIG. 4A, the motor output of the comparative example rises rapidly in the short time Tm, in the same manner as in the case of the acceleration G, and then becomes approximately constant. In FIG. 4A, a dashed dotted line Lc indicates the change of the velocity of the vehicle 12 (vehicle velocity).

On the other hand, in the embodiment example (the first motor control section 200A), when there is a demand for high output, the torque limiting is performed, and therefore, as shown by a solid line Lx in FIG. 4B, the acceleration G rises rapidly to 50% (Gh) of the maximum level Gm, for example, and stays at this level for a relatively long time Tx (e.g. 7 to 10 seconds). After this, the acceleration G decreases. As shown by a dashed line Ly in FIG. 4B, the motor output rises for about the time Tx described above, in the same manner as in the case of the acceleration G and, after this, becomes approximately constant. In FIG. 4B, a dashed dotted line Lz indicates the change of the vehicle velocity.

When comparing the motor output between the comparative example and the embodiment example, the motor output in the comparative example rises steeply, and therefore the time Tn until reaching a prescribed output Ps (e.g. 40 kW) that is less than a maximum motor output Pma is short. In contrast to this, in the embodiment example, the time until reaching the prescribed output Ps described above is long (the time Ty). Therefore, it is understood that, in the embodiment example, the motor output is also limited due to the limiting of the torque.

In this way, the first power source system 10A places a limitation on the demand for torque made to the drive motor 76 in response to the demand for high output made when the FC stack temperature or the FC atmospheric temperature Ta is a low temperature, and therefore it is possible to give the user a feeling of acceleration and also to continue this feeling of acceleration.

Furthermore, since there is no sudden torque demand that accompanies the demand for high output, there is no need for an output response of the FC 14, and it is possible to relax the responsiveness of the FC 14. Since there is no sudden output demand, it is possible to improve the NV (noise vibration) performance.

The following describes a power source system according to a second embodiment (referred to below as a second power source system 10B), while referencing FIGS. 5 and 6.

Figure 5:
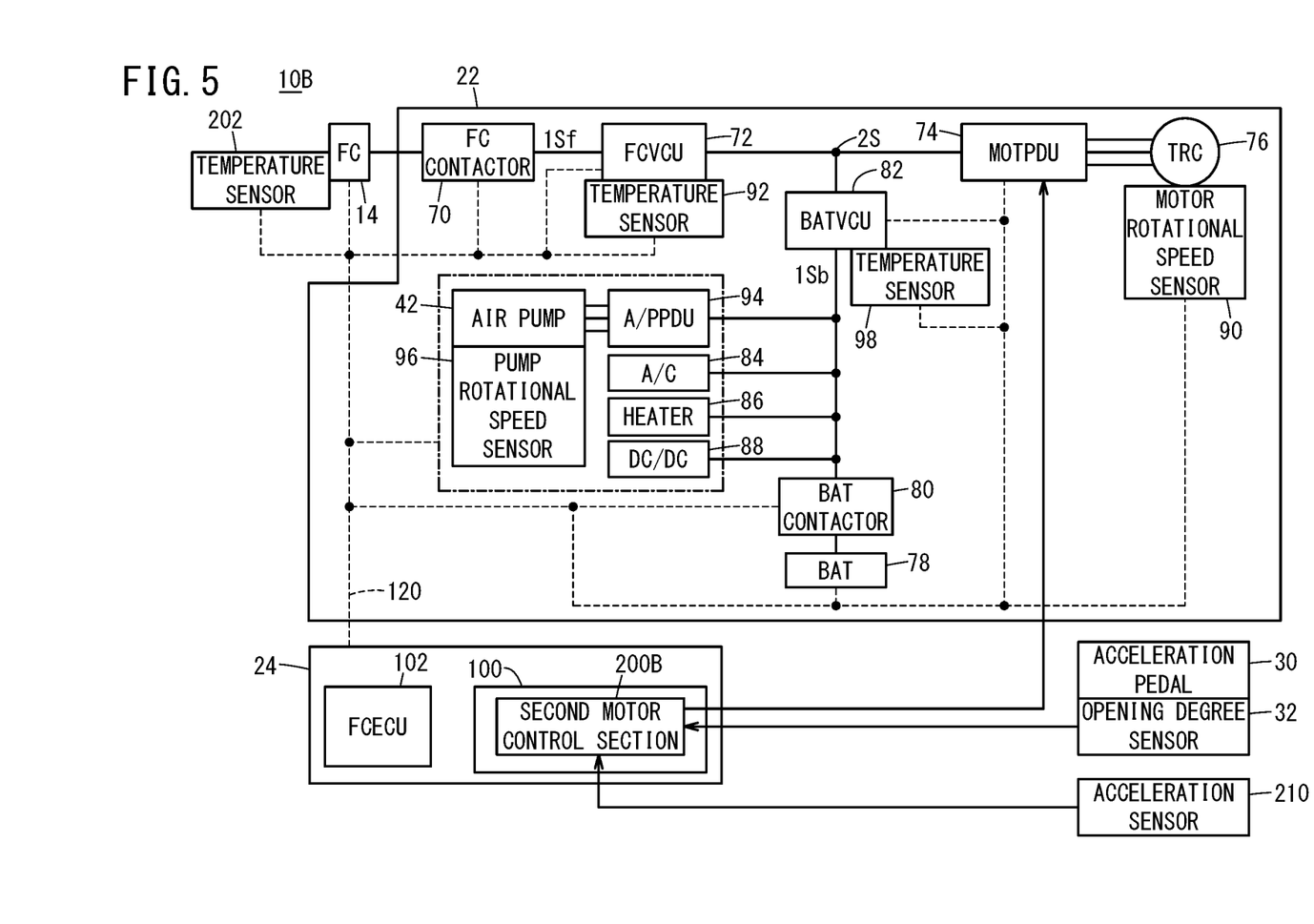
FIG. 5 is a schematic view of an overall configuration of a power system included in a second power source system.

As shown in FIG. 5, the second power source system 10B has approximately the same configuration as the first power source system 10A described above, but differs by including a second motor control section 200B instead of the first motor control section 200A.

The second motor control section 200B outputs a control signal to the inverter 74 based on at least information from an acceleration sensor 210 and the input of the opening degree from the opening degree sensor 32, to control the torque of the drive motor 76.

Specifically, when the vehicle 12 is travelling on a downhill road and a demand for high output is made to the drive motor 76, the second motor control section 200B limits the torque of the drive motor 76 to be lower than the maximum torque that can be output by the drive motor 76, and continuously implements this torque limitation.

Figure 6:
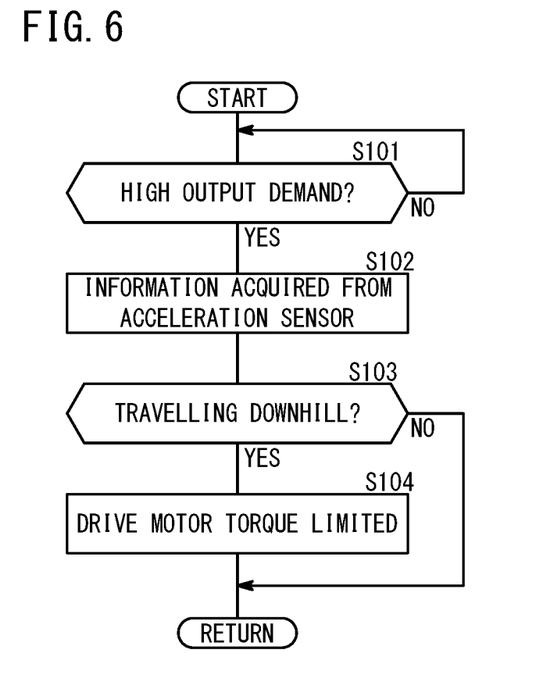
FIG. 6 is a flow chart showing a processing operation of a second motor control section.

The following describes a processing operation of the second power source system 10B, i.e. a processing operation of the second motor control section 200B, while referencing the flow chart of FIG. 6.

First, at step S101 of FIG. 6, the second motor control section 200B determines whether a demand for high output has been made to the drive motor 76.

If a demand for high output has been made, the process moves to step S102, and the second motor control section 200B acquires information from the acceleration sensor 210.

At step S103 described above, if the vehicle 12 is not traveling downhill, the torque limiting is not performed. After this, when a prescribed time has passed, the processes from step S101 are repeated.

At step S103 described above, if the FC stack temperature or the FC atmospheric temperature Ta is greater than or equal to the prescribed temperature Th, the torque limiting is not performed. After this, when a prescribed time has passed, the processes from step S101 are repeated.

In this way, the second power source system 10B places a limitation on the demand for torque made to the drive motor 76 in response to the demand for high output made when the vehicle 12 is travelling downhill, and therefore it is possible to also limit the motor output and to limit the downhill acceleration.

The following describes a power source system according to a third embodiment (referred to below as a third power source system 10C), while referencing FIGS. 7 and 8.

Figure 7:
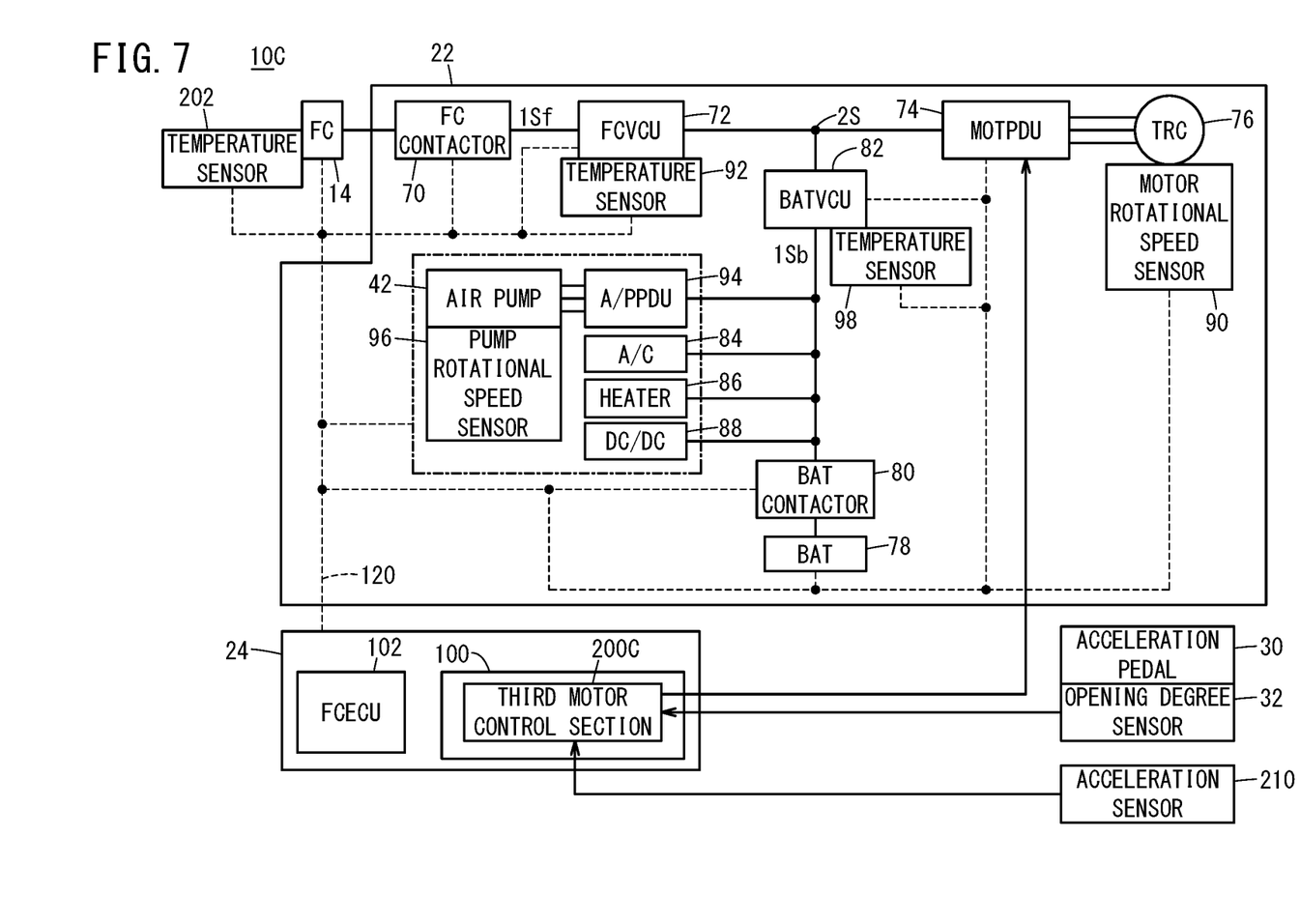
FIG. 7 is a schematic view of an overall configuration of a power system included in a third power source system.

As shown in FIG. 7, the third power source system 10C has approximately the same configuration as the first power source system 10A described above, but differs by including a third motor control section 200C instead of the first motor control section 200A.

The third motor control section 200C outputs a control signal to the inverter 74 based on the temperature information from the third temperature sensor 202 described above, the information from the acceleration sensor 210, and the input of the opening degree from the opening degree sensor 32, to control the torque of the drive motor 76.

Specifically, when the FC stack temperature or the FC atmospheric temperature Ta is a low temperature and also there is a demand for high output made to the drive motor 76, or when vehicle 12 is travelling on a downhill road and a demand for high output is made to the drive motor 76, the third motor control section 200C limits the torque of the drive motor 76 to be lower than the maximum torque that can be output by the drive motor 76, and continuously implements this torque limitation.

Figure 8:
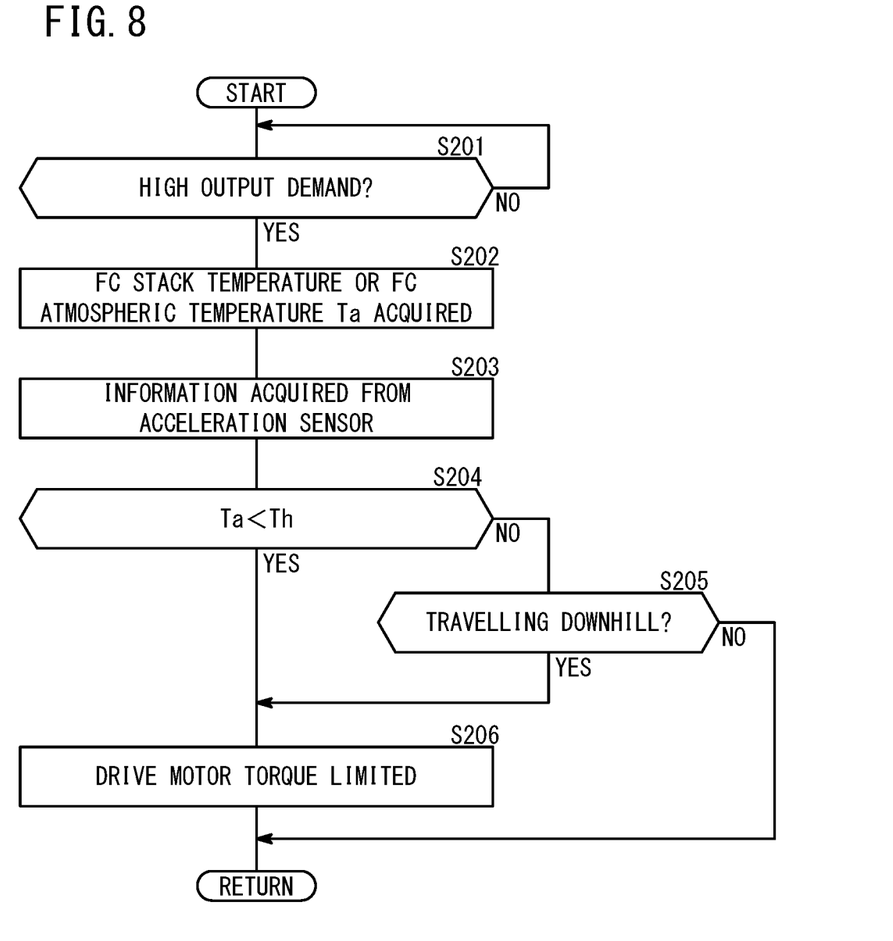
FIG. 8 is a flow chart showing a processing operation of a third motor control section.

The following describes a processing operation of the third power source system 10C, i.e. a processing operation of the third motor control section 200C, while referencing the flow chart of FIG. 8.

First, at step S201 of FIG. 8, the third motor control section 200C determines whether a demand for high output has been made to the drive motor 76. If a demand for high output has been made, the process moves to step S202, and the third motor control section 200C acquires the FC stack temperature or the FC atmospheric temperature Ta from the third temperature sensor 202. Furthermore, at step S203, the third motor control section 200C acquires information from the acceleration sensor 210.

At step S204, the third motor control section 200C determines whether the FC stack temperature or the FC atmospheric temperature Ta is lower than a prescribed temperature Th (i.e. whether this temperature is a low temperature). If the FC stack temperature or the FC atmospheric temperature Ta is determined not to be a low temperature, the third motor control section 200C determines whether the vehicle 12 is travelling downhill at step S205.

Then, if it is determined at step S204 that the FC stack temperature or the FC atmospheric temperature Ta is a low temperature or if it is determined at step S205 that the vehicle 12 is travelling downhill, the process moves to step S206, and the third motor control section 200C limits the torque of the drive motor 76. Specifically, the third motor control section 200C limits the torque to be lower than the maximum torque that can be output by the drive motor 76.

In this way, in the third power source system 10C, the effect of the first power source system 10A and the effect of the second power source system 10B can both be realized, and it is possible to continue the feeling of acceleration in response to the demand for a high output made when the temperature is low while also limiting the acceleration caused by the demand for high output while travelling downhill.

The following is a summary of the embodiments described above.

[1] In the present embodiment, a first power source system 10A comprises a FC 14 (power source) mounted in a vehicle 12; a drive motor 76 (TRC); a third temperature sensor 202 (thermometer) that measures a temperature of the FC 14 (FC stack temperature or the FC atmospheric temperature Ta); and a first motor control section 200A that controls at least torque of the drive motor 76, wherein, when the temperature of the FC 14 is less than or equal to a prescribed temperature Th and a demand for high output is made to the drive motor 76, the first motor control section 200A limits the torque of the drive motor 76 to be lower than a maximum torque that can be output by the drive motor 76 and continues the torque limitation.

In this way, a limitation is placed on the demand for torque made to the drive motor 76 in response to a demand for high output, including a WOT, when the temperature of the FC 14 is low, and therefore it is possible to give the user a feeling of acceleration and to maintain this feeling of acceleration.

Furthermore, since there is no sudden torque demand caused by the demand for high output, there is no need for an output response from the FC 14, and it is possible to relax the responsiveness of the FC 14. Since there is no sudden torque demand, it is possible to improve the NV (noise vibration) performance.

[2] In the present embodiment, a second power source system 10B comprises an FC 14 mounted in a vehicle 12; a drive motor 76; an acceleration sensor 210 that senses a sloped road; and a second motor control section 200B that controls at least torque of the drive motor 76, wherein, when the vehicle 12 is travelling on a downhill road and a high output demand is made to the drive motor 76, the second motor control section 200B limits the torque of the drive motor 76 to be lower than a maximum torque that can be output by the drive motor 76 and continues the torque limitation.

In this way, a limitation is placed on the demand for torque made to the drive motor 76 in response to a demand for high output made when the vehicle 12 is travelling downhill, and therefore it is possible to place a limitation on the motor output as well and to limit the downhill acceleration.

[3] In the present embodiment, a third power source system 10C comprises an FC 14 that is mounted in a vehicle 12; a drive motor 76; a third temperature sensor 202 that measures a temperature of the FC 14; an acceleration sensor 210 that senses a sloped road; and a third motor control section 200C that controls at least torque of the drive motor 76, wherein when the vehicle 12 is travelling on a downhill road while a temperature of the FC 14 is less than or equal to a prescribed temperature Th and a demand for high output has been made to the drive motor 76, the third motor control section 200C limits the torque of the drive motor 76 to be lower than a maximum torque that can be output by the drive motor 76 and continues the torque limitation.

In this way, a limitation is placed on the demand for torque made to the drive motor 76 in response to a demand for high output made when the temperature of the FC 14 is low, and therefore it is possible to give the user a feeling of acceleration and to maintain this feeling of acceleration.

Furthermore, since there is no sudden torque demand caused by the demand for high output, there is no need for an output response from the FC 14, and it is possible to relax the responsiveness of the FC 14. Since there is no sudden torque demand, it is possible to improve the NV (noise vibration) performance.

Yet further, a limitation is placed on the demand for torque made to the drive motor 76 in response to a demand for high output made when the vehicle 12 is travelling downhill, and therefore it is possible to place a limitation on the motor output as well and to limit the downhill acceleration.

[4] In the present embodiment, the first motor control section 200A to the third motor control section 200C limit the gradient of the motor output over the interval during which the torque is limited.

Therefore, by placing a limitation on the demand for torque made to the drive motor 76 in response to a demand for high output made when the vehicle 12 is travelling downhill, it is possible to place a limitation on the motor output as well and to limit the downhill acceleration.

[5] In the present embodiment, at least the demand for high output made to the drive motor 76 is sensed based on a throttle opening degree of the vehicle 12. In this way, it is possible to accurately sense the demand for high output made to the drive motor 76 based on the throttle opening degree of the vehicle 12.

[6] In the present embodiment, a first power source system 10A control method is a control method of a power source system that includes a FC 14 (power source) mounted in a vehicle 12; a drive motor 76 (TRC); a third temperature sensor 202 (thermometer) that measures a temperature of the FC 14 (FC stack temperature or FC atmospheric temperature Ta); and a first motor control section 200A that controls torque of the drive motor 76, wherein, when the temperature of the FC 14 is less than or equal to a prescribed temperature Th and a demand for high output is made to the drive motor 76, the first motor control section 200A limits the torque of the drive motor 76 to be lower than a maximum torque that can be output by the drive motor 76 and continues the torque limitation.

In this way, a limitation is placed on the demand for torque made to the drive motor 76 in response to a demand for high output made when the temperature of the FC 14 is low, and therefore it is possible to give the user a feeling of acceleration and to maintain this feeling of acceleration.

Furthermore, since there is no sudden torque demand caused by the demand for high output, there is no need for an output response from the FC 14, and it is possible to relax the responsiveness of the FC 14. Since there is no sudden torque demand, it is possible to improve the NV performance.

[7] In the present embodiment, a second power source system 10B control method is a control method of a power source system that includes an FC 14 mounted in a vehicle 12; a drive motor 76; a unit 210 (acceleration sensor) that senses a sloped road; and a second motor control section 200B that controls at least torque of the drive motor 76, wherein, when the vehicle 12 is travelling on a downhill road and a high output demand is made to the drive motor 76, the second motor control section 200B limits the torque of the drive motor 76 to be lower than a maximum torque that can be output by the drive motor 76 and continues the torque limitation.

In this way, a limitation is placed on the demand for torque made to the drive motor 76 in response to a demand for high output made when the vehicle 12 is travelling downhill, and therefore it is possible to place a limitation on the motor output as well and to limit the downhill acceleration.

[8] In the present embodiment, a third power source system 10C control method is a control method of a power source system that includes an FC 14 that is mounted in a vehicle 12; a drive motor 76; a third temperature sensor 202 that measures a temperature of the FC 14; an acceleration sensor 210 that senses a sloped road; and a third motor control section 200C that controls at least torque of the drive motor 76, wherein when the vehicle 12 is travelling on a downhill road while a temperature of the FC 14 is less than or equal to a prescribed temperature Th and a demand for high output has been made to the drive motor 76, the third motor control section 200C limits the torque of the drive motor 76 to be lower than a maximum torque that can be output by the drive motor 76 and continues the torque limitation.

In this way, a limitation is placed on the demand for torque made to the drive motor 76 in response to a demand for high output made when the temperature of the FC 14 is low, and therefore it is possible to give the user a feeling of acceleration and to maintain this feeling of acceleration.

Furthermore, since there is no sudden torque demand caused by the demand for high output, there is no need for an output response from the FC 14, and it is possible to relax the responsiveness of the FC 14. Since there is no sudden torque demand, it is possible to improve the NV performance.

Yet further, a limitation is placed on the demand for torque made to the drive motor 76 in response to a demand for high output made when the vehicle 12 is travelling downhill, and therefore it is possible to place a limitation on the motor output as well and to limit the downhill acceleration.

While the preferred embodiments of the present invention have been described above, the technical scope of the invention is not limited to the above described embodiments, and it is obvious that various alterations or improvements can be included in the technical scope of the invention.

What is claimed is:
1. A power source system comprising:
a power source mounted in a vehicle;
a drive motor;
a thermometer configured to measure a temperature of the power source;
one or more processors that execute computer-executable instructions stored in a memory, wherein the one or more processors execute the computer-executable instructions to cause the power source system to:

sense a sloped road;

control at least torque of the drive motor, in a case that a demand for high output is made to the drive motor and the temperature of the power source is less than a prescribed temperature, or in a case that the demand for high output is made to the drive motor, the temperature of the power source is greater than or equal to the prescribed temperature and the vehicle is travelling on a downhill road, implement a torque limitation of the drive motor to limit the torque to be lower than a maximum torque output by the drive motor, make a detection, after a period in which the demand for high output was made while the temperature of the power source was less than the prescribed temperature or when the temperature of the power source is greater than or equal to the prescribed temperature while the vehicle is traveling downhill, that the demand for high output is no longer being made to the drive motor or that the temperature of the power source is no longer less than the prescribed temperature and the vehicle is no longer travelling downhill, and suspend the torque limitation in response to the detection.

2. The power source system according to claim 1, wherein the one or more processors cause the power source system to:

limit a gradient of an output of the drive motor over an interval during which the torque is limited.

3. The power source system according to claim 1, wherein at least the demand for high output made to the drive motor is sensed based on a throttle opening degree of the vehicle.

\* \* \* \* \*